United States Patent [19]

Krause

[11] Patent Number: 5,578,112

[45] Date of Patent: Nov. 26, 1996

[54] MODULAR AND LOW POWER IONIZER

[75] Inventor: Hans W. Krause, Oakville, Canada

[73] Assignee: 999520 Ontario Limited, Toronto, Canada

[21] Appl. No.: 457,680

[22] Filed: Jun. 1, 1995

[51] Int. Cl.⁶ .............................. B03C 3/41; B03C 3/68
[52] U.S. Cl. ..................... 96/24; 96/82; 96/92; 96/96; 96/97; 96/98
[58] Field of Search ........................ 96/80, 83, 84, 96/69, 92, 25, 94–98, 26, 23, 24, 82; 95/78, 80, 81; 361/226, 235; 323/903

[56] References Cited

U.S. PATENT DOCUMENTS

| | | | |
|---|---|---|---|
| 1,130,212 | 3/1915 | Steere | 96/97 X |
| 1,357,202 | 10/1920 | Nesbit | 96/75 |
| 2,097,233 | 10/1937 | Meston | 118/624 |
| 2,637,408 | 5/1953 | Yadoff | 96/80 X |
| 2,868,318 | 1/1959 | Perkins et al. | 96/94 |
| 3,582,711 | 6/1971 | Jahnke | 361/231 |
| 3,695,001 | 10/1972 | Watanabe | 95/78 |
| 3,745,749 | 7/1973 | Gelfand | 96/21 |
| 3,765,153 | 10/1973 | Grey | 55/447 X |
| 3,768,258 | 10/1973 | Smith et al. | 96/97 X |
| 4,216,000 | 8/1980 | Kofoid | 96/80 |
| 4,284,417 | 8/1981 | Reese et al. | 95/3 |
| 4,536,698 | 8/1985 | Shevalenko et al. | 96/80 X |
| 4,689,056 | 8/1987 | Noguchi et al. | 96/79 |
| 4,772,998 | 9/1988 | Guenther, Jr. et al. | 96/25 X |
| 5,404,079 | 4/1995 | Ohkuni et al. | 361/235 X |

FOREIGN PATENT DOCUMENTS

| | | |
|---|---|---|
| 0271457 | 6/1988 | European Pat. Off. . |
| 0850276 | 8/1990 | European Pat. Off. . |
| 526021 | 6/1931 | Germany . |
| 850598 | 9/1952 | Germany . |
| 1002292 | 2/1957 | Germany ............ 96/96 |
| 1963715 | 6/1971 | Germany . |
| 8501858 | 7/1985 | Sweden . |
| 737734 | 9/1955 | United Kingdom . |
| 1218711 | 1/1971 | United Kingdom ........ 96/94 |
| 1238438 | 7/1971 | United Kingdom . |

Primary Examiner—Richard L. Chiesa
Attorney, Agent, or Firm—Ridout & Maybee

[57] ABSTRACT

An apparatus for ionizing air to remove particulate matter. The apparatus including an ionizer and a bracket for mounting the ionizer in a duct or enclosure. The ionizer includes a series of electrodes which span a portion of the duct. The electrodes are energized by a high voltage circuit and an ionic wind is created between the electrode and duct. The ionic wind sweeps particles in the air to the duct which provides a collector electrode. In another embodiment, a ring collector electrode is also provided for spanning the inner portion of the duct. The high voltage circuit includes a DC power supply, a high voltage transformer, a high voltage multiplier stage and a push-pull switching circuit. The DC power supply receives AC power and generates a DC output which is coupled to the primary of the transformer. The push-pull switching circuit produces a controlled and efficient AC output in the transformer by alternately switching the primary winding. The output voltage from the secondary winding is further increased by the multiplier stage to a level sufficient to energize the electrodes and produce the ionic wind.

13 Claims, 6 Drawing Sheets

MODULAR AND LOW POWER IONIZER

FIELD OF THE INVENTION

This invention relates to ionizers and more particularly to a modular and low power ionizer suitable for commercial and residential use.

BACKGROUND OF THE INVENTION

Conventional ionizers or precipitators comprise large and very specialized devices. These devices are intended for large industrial applications, for example a cement factory, and have high power requirements. Due to their large power requirements, the ionizers include separate high voltage power supplies and tend to be very bulky and costly to manufacture and maintain. The devices are typically designed as stand-alone units which are coupled to existing ventilation or heating and cooling equipment. For these reasons, known devices are not well-suited for commercial applications, such as office buildings, or residential or consumer use. Published European Patent Application No. 90850276.8 discloses one such device according to the prior art.

In an office building, the air circulation system includes a filter bank which comprises a matrix of filter modules. Each filter module typically has a mechanical filter element which traps particulate matter in the air before the air is circulated. The filter elements need to be replaced on a regular basis thereby incurring both maintenance and replacement costs. There is also a cost associated with the disposal of the used filter elements. For medical facilities, the filter elements are treated as hazardous biological waste and the disposal costs are significant. Furthermore, the air circulation fans must have the capacity to push the "dirty air" through the filter elements. For a typical office building this means large electric motors with a high horsepower output to drive the circulation fans, which further increases the cost of a conventional air conditioning installation.

There is also reason to believe that filter elements which have become contaminated may contribute to "sick building syndrome".

Accordingly, there is a need for an ionizer which is suitable for commercial and residential use. It is an object of the present invention to provide a modular ionizer which may be integrated with an existing heating or cooling duct in the heating and cooling equipment (HVAC) of a building. It is another object of the present invention to provide an ionizer with an integrated high voltage generator which is operated from conventional AC power and features low power consumption. It is a further object of the present invention to provide an ionizer which produces negligible amounts of ozone as a by-product of the ionization process. It is yet a further object of the present invention to provide a modular ionizer which is arranged with other ionizer modules to form an ionizer bank or matrix suitable for use in larger installations such as those found in residential condominiums, office buildings, medical facilities, laboratories, food processing plants, electronic assembly (i.e. "clean-room") plants, and manufacturing and industrial plants.

BRIEF SUMMARY OF THE INVENTION

In a first aspect, the present invention provides an apparatus for purifying gas flowing in a duct by establishing a radially directed ionic wind within the duct to sweep particulate solids directly onto one or more collector electrodes, said apparatus comprising: (a) an ionizing unit; (b) means for supporting said ionizing unit within the duct, said ionizing unit comprising, (i) a water-tight housing, (ii) a high voltage generator within the housing and having a high voltage output, (iii) an electrode support rod coupled to said high voltage output and extending from said housing coaxially within said duct, (iv) at least one group of ionizing electrodes mounted on said support rod and extending radially therefrom; and (c) means for connecting said high voltage generator to an external low voltage power supply.

In a second aspect, the present invention provides an air purifier for purifying air in an enclosed space and said enclosed space being provided with an AC power supply, said air purifier comprising: (a) an enclosure having at least one collecting electrode; (b) an ionizing unit; (c) means for supporting said ionizing unit inside said enclosure, said ionizing unit comprising, (i) a water-tight housing, (ii) a high voltage generator within said housing for generating a high voltage output, (iii) an electrode support rod coupled to said high voltage output and extending from said housing coaxially within said duct, (iv) at least one group of ionizing electrodes mounted on said support rod and extending radially therefrom for establishing a radially directed ionic wind within said enclosure to sweep particulate solids in the air directly onto said collector electrode; (d) means for connecting said high voltage generator to the external AC power supply; and (e) said enclosure including an air intake port and an air exhaust port.

BRIEF DESCRIPTION OF THE DRAWINGS

Reference will now be made to the drawings which illustrate, by way of example, a preferred embodiment of the present invention, and in which.

DETAILED DESCRIPTION OF THE PREFERRED EMBODIMENTS

Figure 1:
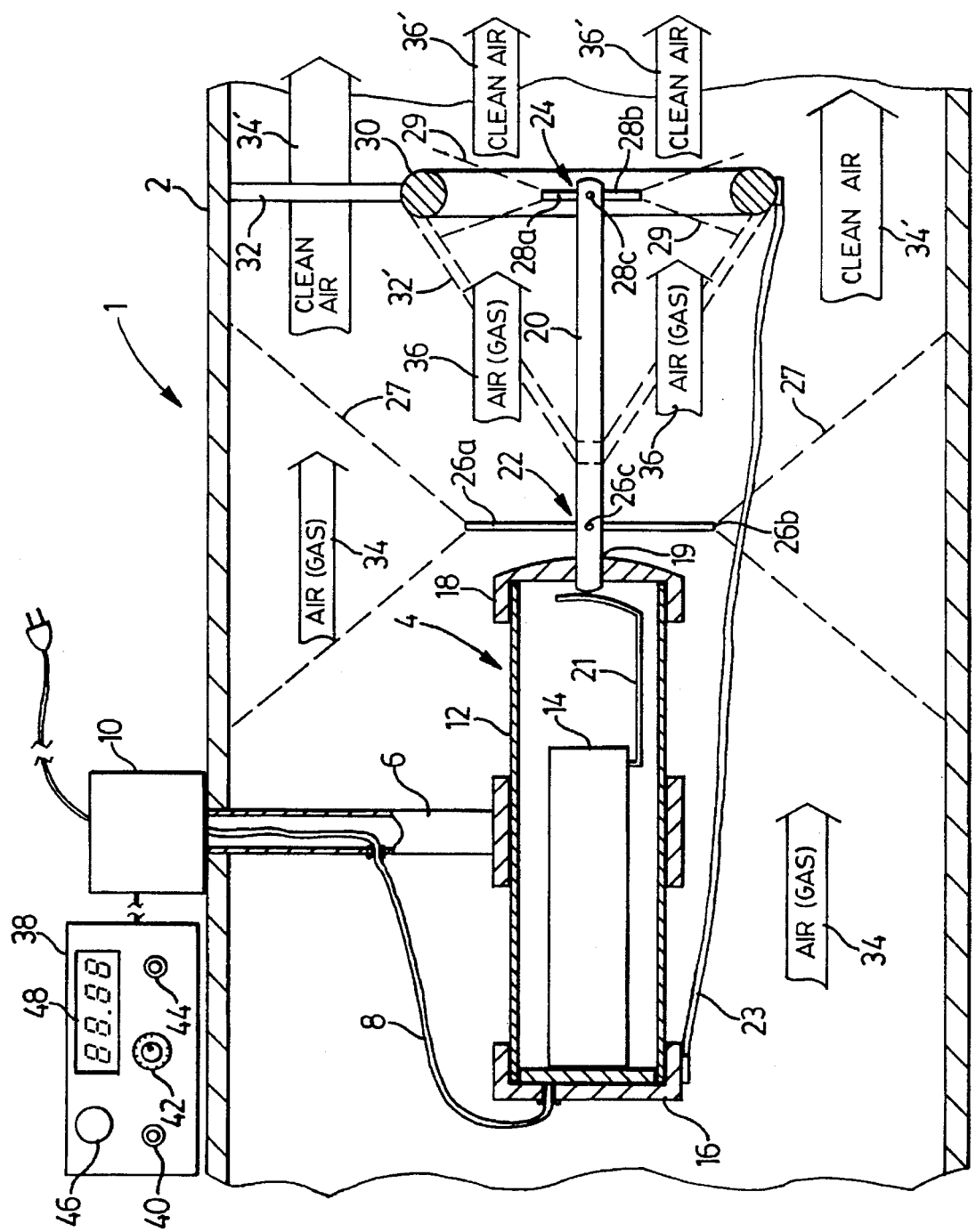
FIG. 1 is a cross-sectional view of an ionizing apparatus according to the present invention.

Reference is first made to FIG. 1 which shows an ionizing apparatus 1 according to the present invention. The ionizing apparatus 1 comprises a tubular member or conduit 2 and an ionizer 4. As shown, the ionizer 4 is mounted coaxially inside the tubular member 2 by a support bracket 6. The tubular member 2 can comprise an existing duct connected to the heating and cooling equipment (HVAC) of a building. Alternatively, the tubular member 2 can comprise a separate member which provides a housing or enclosure and an ionization chamber for the ionizer 4. The support bracket 6 also provides a power feed for the ionizer 4. The power feed comprises a power cable 8 coupled to a power transformer 10.

Figure 4A:
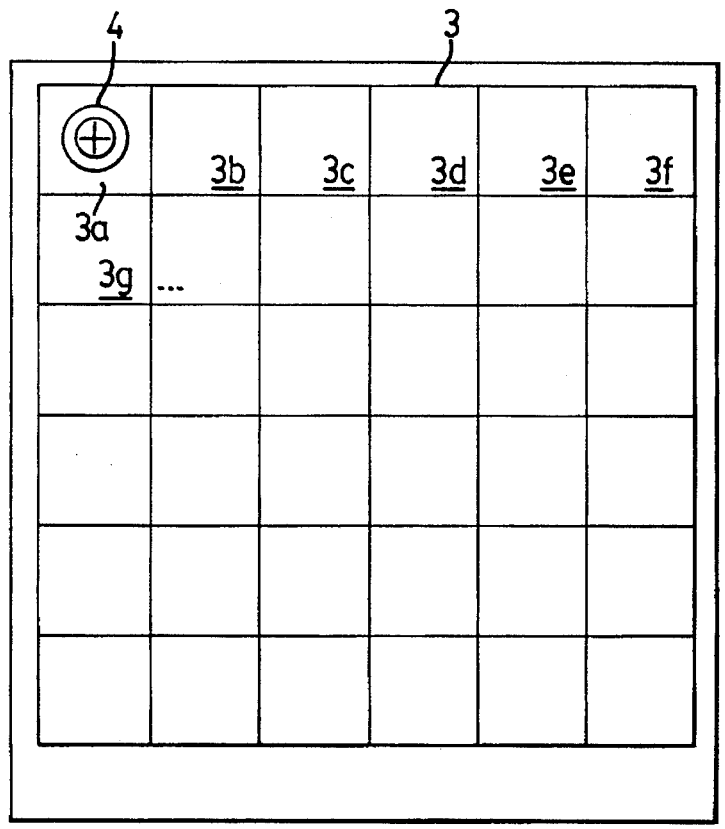
FIG. 4(a) shows a bank of ionizers according to the invention.
Figure 4B:
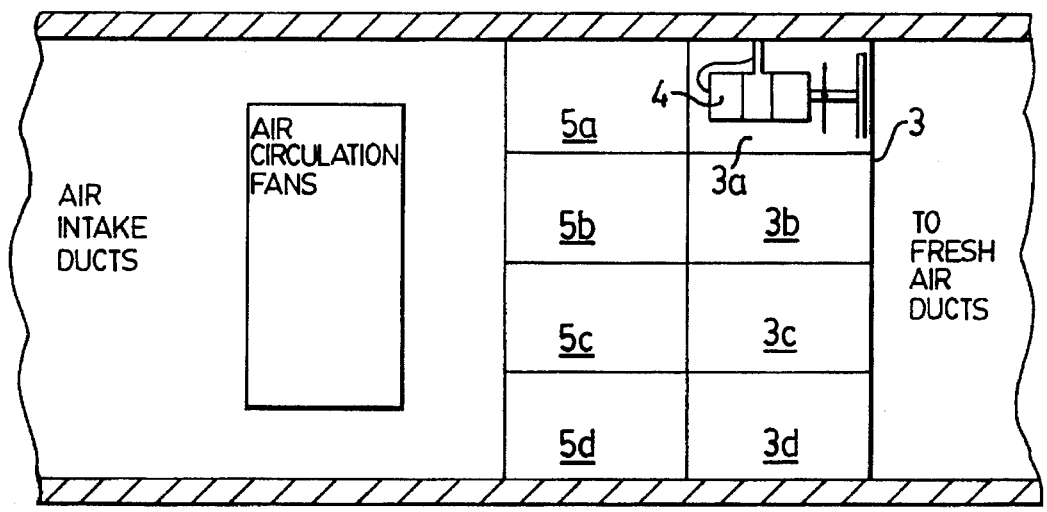
FIG. 4(b) shows another arrangement for a bank of ionizers according to the invention.

It is a feature of the present invention that the ionizer 4 is powered using conventional AC or "mains" power and the transformer 10 is simply plugged into a wall socket. The power transformer 10 can comprise a conventional 110 VAC transformer or alternatively a 24 VAC step-down transformer. Furthermore, the modular nature of the device 1 allows the ionizer 4 to be integrated with the existing heating or cooling system of a building. For example, the tubular member 2 can comprise a heating duct connected to the furnace. The bracket 6 attaches the ionizer 4 to the duct 2 and power is provided by an electrical outlet. For larger applications, e.g. an office building, the ionizers 4 are arranged in a bank or matrix 3 as shown in FIG. 4(a). The bank 3 comprises a plurality of modules or cells 3a,3b,3c,3d . . . each having an ionizer 4 (as depicted for the first cell 3a). The bank or matrix 3 of ionizers 4 can replace or augment the existing air filter bank (not shown). The ionizers 4 can also be "daisy chained" inside the air circulation duct as shown in FIG. 4(b). In FIG. 4(b), another column of modules 5a,5b,5c,5d are located behind the modules 3a,3b,3c,3d. This arrangement can increase the amount of particulate matter removed from the air.

Alternatively, the device 1 is manufactured as a stand-alone unit which is positioned in a room of a residential home for example and plugged into a wall socket. The stand-alone unit includes intake and exhaust ports and can also have a fan (not shown). It will be appreciated that such a stand-alone unit will need appropriate EMI shielding and safety features.

As shown in FIG. 1, the ionizer 4 comprises a water-tight enclosure 12 which houses a high voltage circuit 14. One end of the enclosure 12 is sealed by an aluminum lid 16 which also acts as a heat sink for the high voltage circuit 14. The heat sink capability of the lid 16 is augmented by the flow of air 34 through the duct 2, however, the direction for the air flow 34 can be opposite to that shown in FIG. 1. A cap 18 is attached to the other end of the enclosure 12 and provides a water-tight seal. Attached to the cap 18 through a sealed (e.g. rubber gasket) opening 19 is an electrical discharge rod 20. The discharge rod 20 is electrically coupled through a contact 21 to the circuit 14 and receives the high voltage output generated by the circuit 14. The electrical discharge rod 20 includes two groups of ionizing electrodes denoted by references 22,24 respectively. Each group of ionizing electrodes 22,24 comprises four wires 26a,26b,26c and 28a,28b,28c with the fourth wire not being shown. The distance between adjacent ionizing electrodes, i.e. 26a and 28a, is approximately 18 inches. Each group of ionizing electrodes 22,24 can comprise more than four wires, but preferably there are at least four wires.

As shown in FIG. 1, there is provided a ring 30. The ring 30 is coupled to the duct 2 by a bracket 32 as shown in FIG. 1. Alternatively, the ring 30 is supported by an insulated bracket 32'(shown in broken outline) which is connected to the rod 20 and the ring 30 is held at the desired potential, e.g. ground, using a shielded wire 23. The ring 30 is made from a conductive material such as copper and provides a collector electrode for the second group of ionizing electrodes 24. As shown in FIG. 1, the ionizing electrodes 28a,28b are shorter than the ionizing electrodes 26a,26b in the first group 22, and the combination of the ring 30 and ionizing electrodes 28a,28b (and 28c,28d) ionizes a portion of the airflow in the duct 2 which does not pass over the first group of ionizing electrodes 22.

In operation, the high voltage circuit 14 produces a high voltage output up to 120 kV at a maximum output current of 1.0 mA. The high voltage output energizes the discharge rod 20 and the ionizing electrodes 26,28. A flow of "dirty" air (or gas) 34 is passed through the ionization chamber, e.g. duct 2, and the air molecules and particulate matter in the air flow 34 are ionized as they pass by the ionizing electrodes 26,28. (The dirty air 34 will contain particulate solids, such as dust, smoke and the like.) An ionic wind 27 (shown using the broken line outline) is produced between the wires 26 forming the first ionizing electrode group 22 and the inside surface of the duct 2.

The duct 2 (i.e. inside surface of the duct 2) provides a collector electrode for collecting particles which are picked up by the action of the ionic wind 27. The primary function of the duct 2 is to act as a "collector" electrode to collect the particulate solids which are swept by the ionic wind 27 created by the ionizing electrodes 26a,26b,26c,26d. (The duct 2 also acts act as a "Faraday" cage or shield.) Similarly, for the second group of ionizing electrodes 24, an ionic wind 29 (shown using the broken outline) is generated between the tips of the ionizing electrodes 28a,28b,28c,28d and the ring 30. The ionic wind 29 is predominantly negative, and therefore the ring 30 is grounded by the duct 2 or the shielded wire 23. The ionic wind 29 generated by the second group of ionizing electrodes 24 is intended for dirty air 36 which flows inside of the ionizing electrodes 26a,26b,26c, 26d, for example, due to the turbulence caused around the end cap 18. The resulting clean air flow 34' and 36' continues to pass through the duct 2.

It has been found that the efficacy of the ionizer 4 increases with the arrangement of the ring 30 and the ionizing electrodes 28a,28b,28c,28d. Preferably, the distance between tips of the ionizing electrodes 26a,26b,26c, 26d (or electrodes 28a,28b,28c,28d) and the duct 2 (or ring 30) is in the range 10 to 15 cm. It will be appreciated that the distance is also dependent on the field strength produced by the ionizer 4.

As shown in FIG. 1, the ionizing apparatus 1 can also include a control panel 38. The control panel 38 provides a user interface for set-up and maintenance. The control panel 38 includes an ON/OFF switch 40, an OUTPUT level adjust dial 42, a RESET switch 44, a POWER OUTPUT indicator 46 and an output current meter 48.

For maintenance, a water jet is used to clean the particles which have accumulated on the inside surface of the duct 2 or on the surface of the ring 30. Because the enclosure 12 is water-tight, the device 1 may be conveniently washed without removing the ionizer 4 from inside the duct 2. Alternatively, the modular nature of ionizer 4 and support bracket 6 permit the ionizer 4 to be removed from the inside surface of the duct 2 (or housing).

As shown in FIG. 1, a feature of the present invention is the arrangement of the high voltage circuit 14 inside a water-tight enclosure 12 which is mounted coaxially in the member 2. This arrangement simplifies construction and installation of the device 1 in existing duct work, and also facilitates cleaning of the device 1. The modular nature of the ionizer 4 also makes it suitable for forming a bank or matrix 3 as shown in FIGS. 4(a) and 4(b). Another feature of the present invention is the capability to use conventional AC power to operate the device 1 which makes the device 1 attractive for wide-spread applications, e.g. commercial office buildings and private residential homes. This advantage is realized by the high voltage circuit 14.

Figure 2:
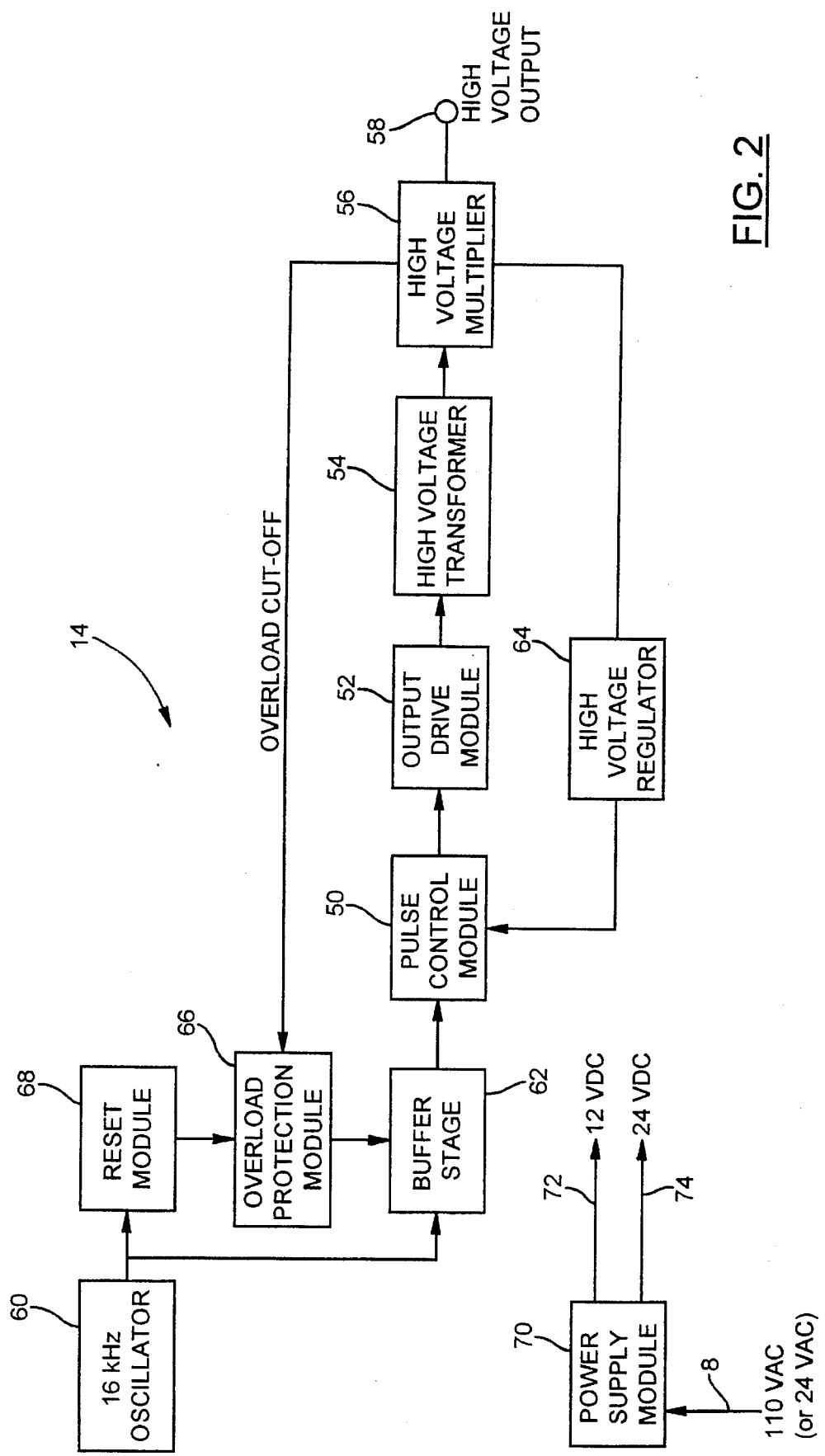
FIG. 2 is a block diagram of circuitry of the apparatus of FIG. 1.

The high voltage circuit 14 is shown in block diagram form in FIG. 2. The high voltage circuit 14 comprises a pulse control module 50. The pulse control module 50 is coupled to an output drive module 52. The output drive module 52 comprises a "push-pull" circuit which drives the primary winding of a high voltage transformer 54. As will be described, the pulse control module 50 produces pulse signals for controlling the push-pull circuit in the output module 52. The output, i.e. secondary winding, of the high voltage transformer 54 is coupled to a high voltage multiplier 56. The high voltage multiplier 56 increases the voltage in the secondary of the transformer 54 to a suitable high voltage level on output port 58. The high voltage output 58 is coupled to the discharge rod 20 through the electrical contact 21 (FIG. 1). The high voltage transformer 54 together with the high voltage multiplier 56 generate the high voltage output for energizing the ionizing electrodes 26,28 connected to the discharge rod 20.

Referring still to FIG. 2, the high voltage circuit 14 includes an oscillator 60. The oscillator 60 provides a reference trigger signal for the pulse control module 50. The output from the oscillator 60 is coupled to the pulse control module 50 through a buffer stage 62. The buffer stage 62 provides the drive for the reference trigger signal and prevents loading of the output from the oscillator 60.

The circuit 14 also includes a high voltage regulator 64. The high voltage regulator 64 is coupled to the transformer 54 and the pulse control module 50. The high voltage regulator 64 comprises a feedback circuit which controls the pulse control module 50 based on the output of the high voltage transformer 54.

The circuit 14 is powered by a DC power supply 70. The DC power supply 44 is connected to the AC power transformer 24 through the cable 8. The cable 8 can also include additional conductors for the control panel 38, e.g. the RESET switch 44, the output adjust dial 42, and the current meter 48.

As shown in FIG. 2, the high voltage circuit 14 also includes an overload protection module 66. The overload protection module 66 has an input coupled to the high voltage multiplier 56 and an output coupled to the buffer stage 62. If the output current of the high voltage circuit 14 exceeds a predetermined amount (which is adjustable), the overload circuit 66 is triggered to disable the pulse control module 50 and the output drive module 52.

Once triggered the pulse control module 50 remains disabled until the overload module 66 is reset. The high voltage circuit 14 includes a reset module 68 for resetting the overload protection module 66. The reset module 68 automatically generates a reset signal after a predetermined time. The reset module 68 can also be activated by manually depressing the reset switch 44 located on the control panel 38 (FIG. 1). The oscillator 60 also provides a timing reference signal for the reset module 68 as will be described in more detail below.

Referring again to FIG. 2, the high voltage circuit 1 has DC power supply module 70 which converts the 110 VAC (or 24 VAC) power feed from the transformer 10 into a 12 VDC output 72 and a 24 VDC output 74. The 12 VDC output 72 provides a supply rail for the electronic components comprising the high voltage circuit 14 and the 24 VDC output 74 is used to energize the high voltage transformer 38 and generate the high voltage on output 58. As will be described, the high voltage circuit 14 provides a compact and cost-effective electronic circuit for producing the high voltage output needed for generating the ionic wind to ionize the "dirty" air flow 34,36.

Figure 3A:
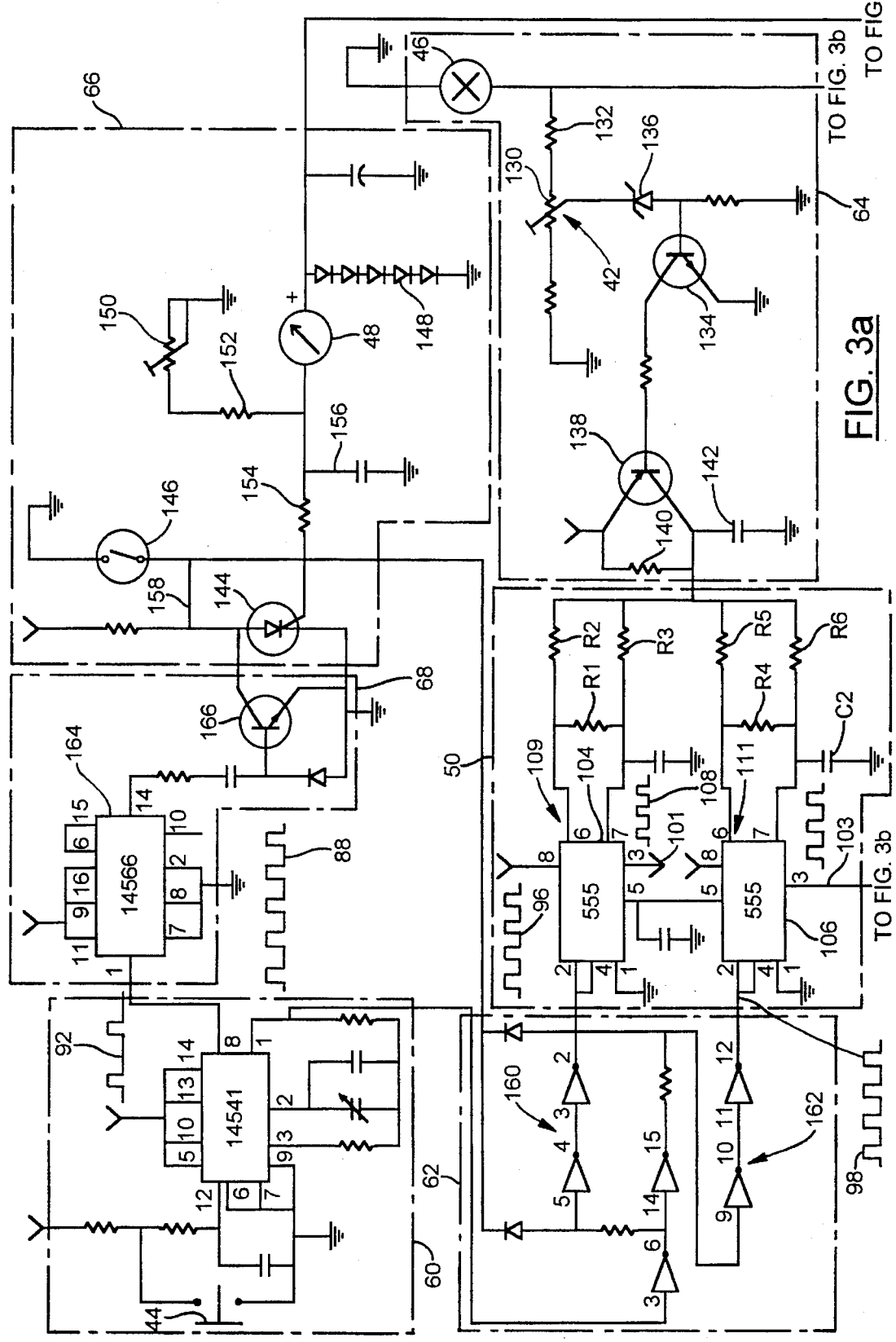
FIGS. 3(a) and 3(b) show the circuitry of FIG. 2 in schematic form.
Figure 3B:
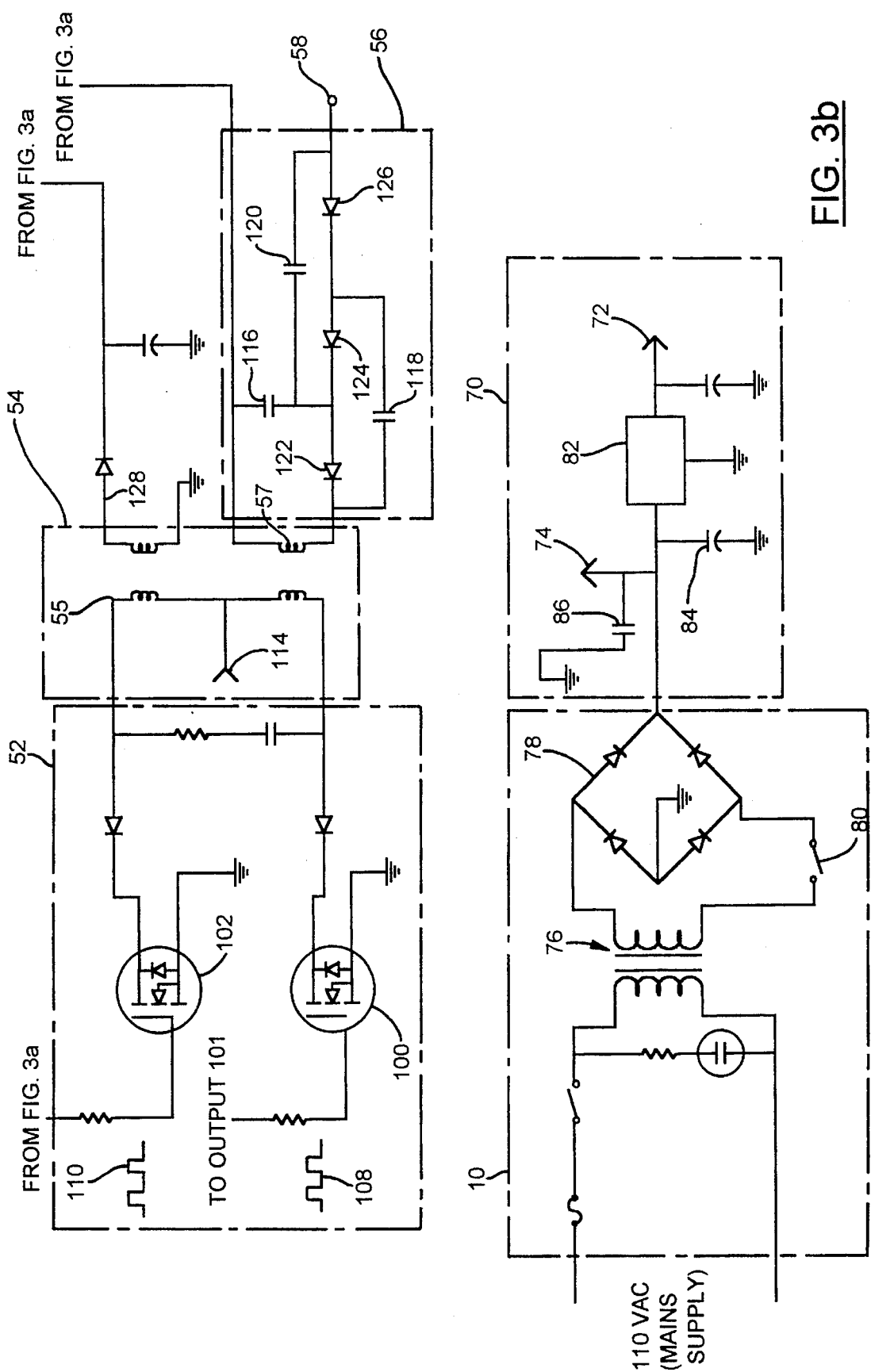

Reference is next made to FIG. 3 which shows the high voltage circuit 14 in more detail. The DC power supply 70 is coupled to the output of the AC power supply 10 through the cable 8. In the preferred embodiment, the AC power supply 10 includes a step-down transformer 76 and a full-wave rectifier 78 connected to the secondary winding of the transformer 76. The AC power supply 10 also includes a safety switch 80 which is connected to the secondary winding of the transformer 76. The function of the safety switch 80 is to disable the power feed if the access door (not shown) to the duct 2 is opened by maintenance personnel. The safety switch 80 can comprise a reed switch. The output from the rectifier 78 is coupled to the DC power supply 70 over cable 8 (FIG. 1). The DC power supply 70 comprises a voltage regulator 82 and capacitors 84,86. The rectified output from the AC power supply 10 is filtered by capacitors 84,86 to produce a DC voltage signal. The component values are selected to produce the 24 volt DC output 74. The DC voltage output 74 is also regulated by the voltage regulator 82 to produce the +12 Volts supply rail 72. The output of the regulator 82 includes a capacitor 88 for "smoothing" the 12 Volt supply 72.

As shown in FIG. 3, the oscillator 60 is implemented using a programmable timer chip, such as the MC14541 available from Motorola Corporation. The timer chip is configured to provide a 16 kHz signal 88 on output 90. The selection of the values for the resistors and capacitors connected to pins 1,2,3 of the timer chip is within the understanding of one skilled in the art. The timer chip also includes a 16-stage binary counter which provides a timing signal 92 on output 94 for the reset module 68.

The 16 kHz signal 88 is buffered by the buffer stage 62. The buffer stage 62 is implemented using a single package chip containing six inverters, such as the MC4049 available from Motorola Corporation. The individual inverters are cascaded in pairs to produce a non-inverting buffer. The buffer stage 62 produces two buffered output reference signals 96,98 which are 180° out of phase. The buffered output signals 96,98 provide reference inputs to the pulse control module 50.

The pulse control module 50 and the output drive module 52 comprise a "push-pull" arrangement which drives the high voltage transformer 54. The push-pull arrangement produces a more efficient power output from the transformer 54. As shown in FIG. 3, the output drive module 52 comprises a pair of power transistors 100,102. The outputs, i.e. drain and source, of the transistors 100,102 are coupled to the primary winding 55 of the high voltage transformer 54. The control input, e.g. gate, of the transistors 100,102 are coupled to respective outputs 101,103 of the pulse control module 50. The pulse control module 50 produces pulses which switch the transistors 100,102 on and off, thereby controlling the current flowing in the primary winding 55 of the transformer 54. The current flowing in the primary winding 55 induces a voltage in the secondary winding 57 of the transformer 54. The induced voltage is multiplied by the high voltage multiplier 56 to produce a high voltage at output 58.

The pulse control module 50 comprises a pair of monostable multivibrators 104,106 which are implemented using first and second LM555 type timer chips, as will be understood by those skilled in the art. The reference signal 96 provides the "trigger" signal for the first monostable vibrator or pulse generator 104, and the reference signal 98 provides the "trigger" signal for the second monostable 102. In response to the reference signal 96, the first pulse generator 104 generates a pulse signal output 108 which drives the gate of the power transistor 100. Similarly, the second pulse generator 106 produces a pulse signal 110 which drives the gate of the second power transistor 102. The duty cycle of the pulse signals 108,110 is determined by a resistor/capacitor network 109,111 connected to the THRESHOLD and DISCHARGE inputs of the 555 timer chip as will be within the understanding of those skilled in the art. In the preferred embodiment, the duty cycle is approximately 25%. To protect the transistors 100,102 the outputs of the pulse generators 104,106 include resistors as shown. Preferably, the transistors 100,102 comprise insulated-gate bipolar power transistors of the type available from International Rectifier, e.g. IRGBC30F. The transistors 100,102 can also be implemented MOSFET power transistors which have been rated appropriately as will be within the knowledge of those skilled in the art.

Figure 5:
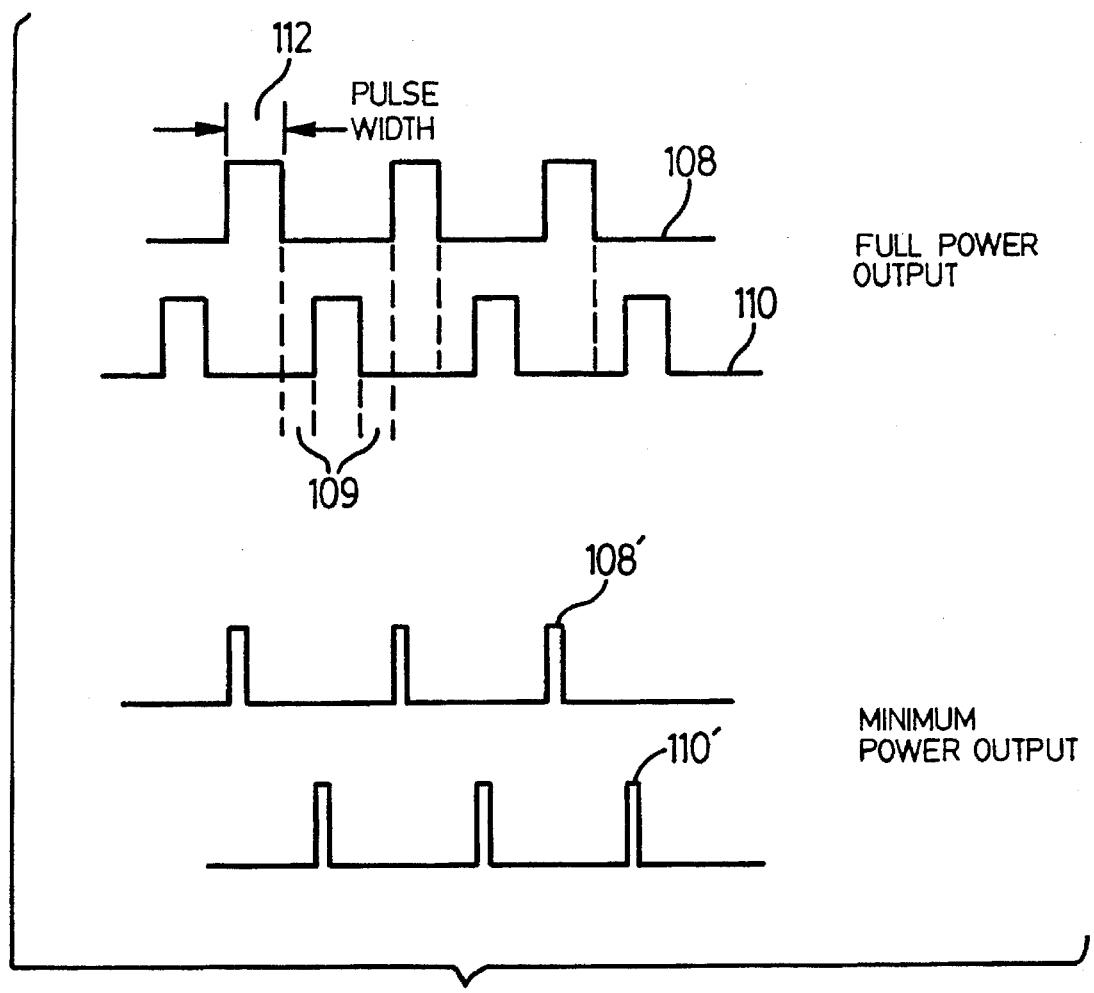
FIG. 5 is a timing diagram showing the relationship between selected control signals generated in the circuit of FIG. 3.

The relationship between the pulse signals 108 and 110 is shown in FIG. 5. There is a phase shift or time lag 109 between the pulse signals 108,110 which produces the push-pull action for the power transistors 100,102, i.e. when the first transistor 100 is ON, the second transistor 102 is OFF. When the circuit 14 is set to full power output (i.e. using control dial 42), each pulse 108,110 has a width 112 of approximately 15 micro-seconds. At minimum power output, the pulse width for pulse signals 108' and 110' is approximately nano-seconds.

Referring back to FIG. 3, the primary winding 55 of the transformer 54 includes a centre-tap 114 which is connected to the +24 VDC output 74 from the power supply 70. In response to the pulse control signals 108,110, the current is first "pushed" and then "pulled" through the primary winding 55 of the transformer 54. For example, when the first transistor 100 is ON, the second transistor 102 is OFF, and current flows through the first transistor 100 and a voltage is induced in the secondary winding 57 of the transformer 54. Conversely, when the second transistor 102 is ON, the first transistor 100 is OFF, and current flows in the opposite direction through the second transistor 102 and primary winding 55. The push-pull arrangement according to the present invention reduces the magnetization or saturation of the transformer core which would occur if the primary winding 55 was excited in only one direction, CLASS A mode. Because the operation of the transistors 100,102 alternates the current direction in the primary winding 55, the magnetic field in the transformer core is allowed to collapse during the time lag 109 between respective pulses in the signals 108,110 (FIG. 5). This allows the transformer 54 to operate more efficiently.

Referring again to FIG. 3, each time one of the transistors 100,102 is switched ON, a current flows in the primary winding 55 and a voltage is induced in the secondary winding 57 of the transformer 54. The secondary winding 57 of the transformer 54 "steps-up" the induced voltage and as will be described, the induced voltage is increased to the 120 KV output level through the operation of the high voltage multiplier 56. To provide a sufficient "step-up", the secondary winding 57 of the transformer 38 has a winding ratio of approximately 1/1000. In addition, the transformer 38 preferably has a ferrite core with no air gap, and the secondary winding 57 is rated for a minimum output of 22.5 kV.

As shown in FIG. 3, the secondary winding 57 is coupled to the high voltage multiplier 56. The high voltage multiplier 56 comprises a cascade stage and is formed from a series of capacitors 116,118,120 and diodes 122,124,126. (If the shield wire 23 is used with the ring 30, the capacitance of the wire 23 can be factored into the cascade stage.) The capacitors and diodes are configured as a voltage multiplier as will be understood by those skilled in the art. The function of the high voltage multiplier 56 is to further increase or multiply the "stepped-up" voltage produced in the secondary winding 57 of the transformer 54 (through the "push-pull" switching of the 24 VDC in the primary winding of the transformer 54). In the present configuration, the capacitors 116,118,120 have been selected to produce a 90 kV output and are rated as 400 pF at 30 kV, 200 pF at 60 kV, and 200 pF at 60 kV, respectively. The diodes 122,124,126 are rated for 35 kVRMS. The output 58 of the high voltage multiplier 56 is electrically coupled to the discharge rod 20 by the contact 21 (FIG. 1).

Referring again to FIG. 3, a third winding 128 on the core of the high voltage transformer 54 provides an input for the high voltage regulator 64. The function of the high voltage regulator 64 is to regulate or control the output of circuit 14. This is done by controlling the duty cycle of the pulse signals 108,110 based on the desired Output voltage level. The output voltage level is set by the output adjust dial 42 located on the control panel 38 (FIG. 1). As shown in FIG. 3, the adjust dial 42 comprises a potentiometer 130 which is coupled to the winding 128 through a resistor 132. The wiper of the potentiometer 130 is coupled to the base of a NPN transistor 134 through a Zener diode 136. The collector of the transistor 134 is connected to the base of a PNP transistor 138. The PNP transistor 138 together with a resistor 140 and a capacitor 142 provide the bias voltage for the networks 109,111 which control the duty cycle of the respective pulse signals 108,110. By varying the duty cycle, the level of high voltage output and ionization is adjusted.

The voltage induced in the winding 128 is proportional to the output voltage at output 58. When the voltage in the winding 128 exceeds the threshold level (as set by the potentiometer 130) the Zener diode 136 will conduct causing the transistor 134 to turn ON. This in turn causes the second transistor 138 to turn ON and the bias voltage for the networks 109,110 changes thereby causing the pulse width 112 and the duty cycle of the pulse signals 108,110 (FIG. 5) to decrease. As shown in FIG. 3, the POWER OUTPUT indicator 46 is also connected to the winding 128. The indicator 46 comprises a lamp which increases in intensity as the applied voltage increases.

Referring still to FIG. 3, the overload protection module 66 comprises a thyristor or SCR 144 and a thermal switch 146. The SCR 144 disables the circuit 14 if a predetermined output current level is exceeded. In the preferred embodiment, the output current level is adjustable from 0.2 to 1.5 mA. The thermal switch 146, on the other hand, disables the circuit 14 if a safe operating temperature is exceeded, for example 75° C. The gate of the SCR 142 is connected in series to the current meter 48 and the secondary winding 57 of the high voltage transformer 54. A diode chain 148 protects the current meter 48 (and overload circuit 66).

The current overload threshold, i.e. trigger point for the SCR 144, is set by a potentiometer 150. The potentiometer 150 is connected to the gate of the SCR 144 through resistors 152,154. The overload circuit 66 also includes a capacitor 156 to prevent noise spikes from falsely triggering the SCR 144. The component values are selected to provide an overload current setting in the range of 0.2 to 1.5 mA. (The potentiometer 150 can be set at the factory or coupled to a dial (not shown) on the control panel 38.) The output 158 of the SCR 144 is coupled to the input of each buyer inverter pair 160,162 in the buyer stage 62. When the current exceeds the threshold level, the SCR 144 is triggered and the pulse signals 96,98 to the respective monostable vibrators 104,106 are disabled which, in turn, prevents the power transistors 100,102 from switching. The monostable vibrators or pulse generators 104,106 remain in the disabled until the SCR 144 is reset by the reset module 68.

As shown in FIG. 3, the reset module 68 comprises a timer 164 and an output transistor 166. The timer 164 is configured to produce an output signal which turns on the transistor 166 after a predetermined time. The output transistor 166 is connected across the SCR 144. When turned on, the transistor 166 effectively "shorts-out" the SCR 144 and the SCR 144 is reset. (The SCR 144 resets at 0.7 Volts and the collector-emitter voltage for the transistor 166 in saturation is 0.2 Volts.) The timer 164 is implemented using the MC14566 industrial time base generator chip available from Motorola Corporation. The timer chip 164 has an input which is connected to the output 94 of the oscillator 60 for receiving the timing signal 92. The timer chip 164 is configured to produce an output signal for turning on the transistor 166 every 4 minutes. Additionally, the SCR 144 may be manually reset by depressing the RESET switch 44 located on the control panel 38.

The output of the thermal switch 146 is also connected to the inputs of the inverter pairs 160,162 in the buffer stage 62. When the operating temperature exceeds a predetermined threshold, e.g. 75° C., the thermal switch 146 is activated and pulls the input to buffers 160,162 to ground thereby disabling the pulse generators 104,106.

It will be appreciated that the high voltage circuit 14 according to the present invention provides an elegant and cost-effective solution to implementing the ionizer 4. The high voltage circuit 14 combined with the modular design of the ionizer 4 provides a device which can easily be integrated with the existing duct work or arranged as an ionizer bank to replace known mechanical filter banks in an office building for example.

The present invention may be embodied in other specific forms without departing from the spirit or essential characteristics thereof. Therefore, the presently discussed embodiments are considered to be illustrative and not restrictive, the scope of the invention being indicated by the appended claims rather than the foregoing description, and all changes which come within the meaning and range of equivalency of the claims are therefore intended to be embraced therein.

I claim:

1. An apparatus for purifying gas flowing in a duct by establishing a radially directed ionic wind within the duct to sweep particulate solids directly onto one or more collector electrodes, said apparatus comprising:
   (a) an ionizing unit;
   (b) means for supporting said ionizing unit within the duct, said ionizing unit comprising,
      (i) a water-tight housing,
      (ii) a high voltage generator within the housing for generating a high voltage output,
      (iii) an electrode support rod coupled to said high voltage output and extending from said housing coaxially within said duct,
      (iv) at least one group of ionizing electrodes mounted on said support rod and extending radially therefrom; and
   (c) means for connecting said high voltage generator to an external low voltage power supply.

2. The apparatus as claimed in claim 1, wherein the duct wall comprises a collector electrode for collecting said particulate solids.

3. The apparatus as claimed in claim 2, wherein said ionizing unit includes a plurality of axially spaced groups of ionizing electrodes.

4. The apparatus as claimed in claim 1, further including a ring electrode positioned inside the duct and surrounding one group of said ionizing electrodes, said ring electrode having a diameter spanning a portion of the duct and being electrically connected to ground.

5. The apparatus as claimed in claim 4, wherein said ring electrode is supported by said electrode support rod.

6. The apparatus as claimed in claim 4, wherein said ring electrode is connected to and supported by the duct.

7. The apparatus as claimed in claim 1, wherein said high voltage generator comprises a transformer and control means for energizing said transformer to produce said high voltage output.

8. The apparatus as claimed in claim 7, wherein said control means includes pulse generator means for generating pulses and a push-pull drive circuit coupled to said transformer and responsive to said pulses for energizing said transformer.

9. The apparatus as claimed in claim 8, wherein said high voltage generator includes voltage multiplier means coupled to the output of said transformer for multiplying the output of the said transformer to said high voltage output.

10. The apparatus as claimed in claim 9, wherein said high voltage generator includes regulator means for regulating said high voltage output.

11. The apparatus as claimed in claim 1, wherein said ionizing unit includes overload protection means for disabling said high voltage generator when said high voltage output exceeds a predetermined level.

12. An air purifier for purifying air in an enclosed space in a building and said enclosed space being provided with an external AC power supply, said air purifier comprising:
   (a) an enclosure having at least one collecting electrode;
   (b) an ionizing unit;
   (c) means for supporting said ionizing unit inside said enclosure, said ionizing unit comprising,
      (i) a water-tight housing,
      (ii) a high voltage generator within said housing for generating a high voltage output,
      (iii) an electrode support rod coupled to said high voltage output and extending from said housing coaxially within said duct,
      (iv) at least one group of ionizing electrodes mounted on said support rod and extending radially therefrom for establishing a radially directed ionic wind within said enclosure to sweep particulate solids in the air directly onto said collector electrode;
   (d) means for connecting said high voltage generator to the external AC power supply; and
   (e) said enclosure including an air intake port and an air exhaust port.

13. The apparatus as claimed in claim 12, further including a fan for pulling air through said intake port and out through said exhaust port.

* * * * *